(No Model.)
C. GRACEY.
AMALGAMATING PAN.
No. 284,293. Patented Sept. 4, 1883.
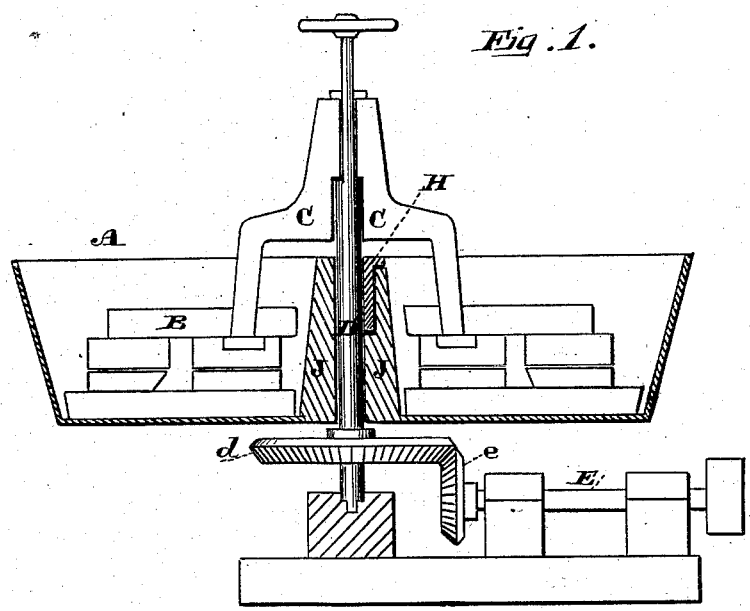
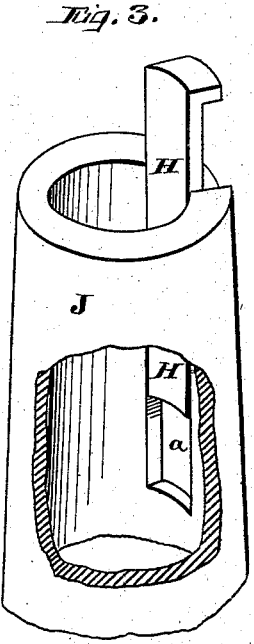
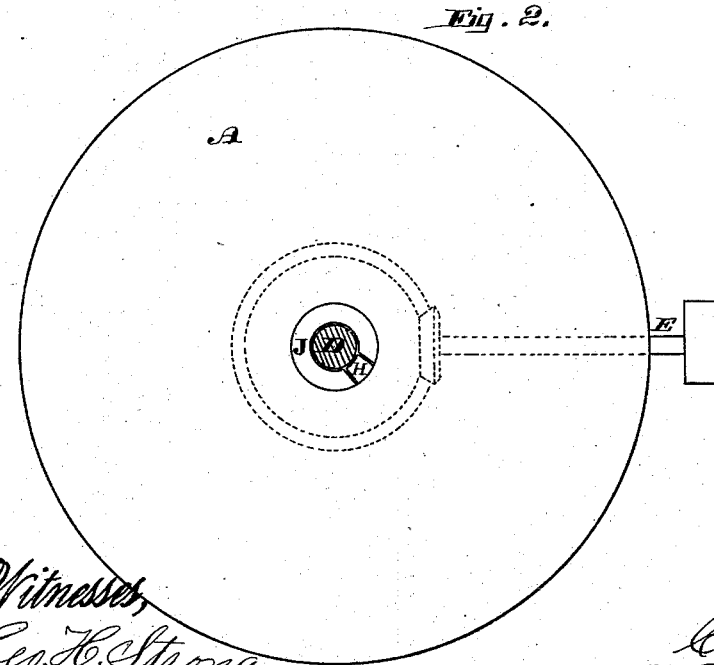
Witnesses,
Geo. H. Strong
[signature]
Inventor,
Chas Gracey
By Dewey & Co.
Attorney

UNITED STATES PATENT OFFICE.

CHARLES GRACEY, OF CONTENTION, ARIZONA TERRITORY.

AMALGAMATING-PAN.

SPECIFICATION forming part of Letters Patent No. 284,293, dated September 4, 1883.

Application filed April 25, 1882. (No model.)

*To all whom it may concern:*

Be it known that I, CHARLES GRACEY, of Contention, county of Cochise, Territory of Arizona, have invented an Improvement in Amalgamating-Pans; and I hereby declare the following to be a full, clear, and exact description thereof.

My invention relates to the class of amalgamating-pans, and particularly to certain improvements in the construction of the journals or bearings of the operating-shafts; and it consists in providing an adjustable and removable gib fitted within the central hollow stationary pillar, called the "pan-cone," at points of wear, and forming a suitable bearing or journal for the upright revolving shaft operating the muller.

The object of my invention is to provide a bearing which, when worn, may be adjusted or removed for the substitution of a new one, whereby the shaft may be kept steady and be preserved, being at the same time easily removable.

Referring to the accompanying drawings, Figure 1 is a section of an amalgamating-pan, showing my invention. Fig. 2 is a top view of the same. Fig. 3 is an enlarged detail.

Let A represent an ordinary pan having suitable dies or a false bottom, and in which a muller, B, is adapted to operate.

C is the yoke connecting the muller with the vertical shaft D, passing down through the bottom of the pan and carrying a gear, d. This meshes with a gear, e, upon a horizontal driving-shaft, E. Motion is thus transmitted to the muller. The upright shaft D passes through a central hollow pillar, J, usually denominated the "pan-cone," which forms a journal or bearing for the said shaft. This is the ordinary construction of a common amalgamating-pan.

It has been found that, on account of the yoke being attached to the top of the shaft and hanging to it with the weight of the muller, the shaft bears with great friction upon the upper part of the cone and soon wears itself so much that it no longer forms a good bearing. In order to remedy this, it is usual to pour into the journal around the shaft enough Babbitt metal to form a bearing-surface for the shaft, and thus protect it from wear. The objection to this is that the Babbitt metal wears very soon, and it is an operation of some time to remove it in order to pour in more. The charge in the pan is liable to run over, and the quicksilver gets upon the Babbitt and causes it to wear very fast. To remove this Babbitt, the gear below has to be taken off and the shaft removed. The Babbitt is then chipped out with considerable labor and the parts put together again and more Babbitt poured around the shaft, which takes up time. If the shaft is at all worn, the Babbitt holds it so tight that it cannot easily be raised up, and much labor may be required to remove the cone itself.

In the top of the cone I provide a recess, $a$, in its inner side, extending down a short distance, and with this I fit a gib, H, the inner surface of which continues that of the cone J and forms a bearing-surface for the shaft D. It is made of any suitable metal, preferably of brass or Babbitt, and is easily removable. When it wears above, as it is likely to do first, it may be adjusted by raising it higher, so as to present a new and narrow bearing-surface. This gib, while preserving the shaft from wear, will allow its ready removal when necessary, simply by its own removal. When worn out, this gib may be removed and another put in its place. It may be placed at any point about the shaft. I have found, however, by experience that the greater portion, if not all, of the wear occurs on that side of the bearing toward which the muller and shaft D revolve, and between points about ten degrees removed from the line of the horizontal driving-shaft E. Therefore there will be need of only one gib, and that placed, as shown, a little to one side of the line of the shaft E, and on the side toward which shaft D revolves. As it will be found that almost all the wear is at this place, Babbitt metal may be poured in around the shaft in other places, and thus the shaft may be preserved.

Having thus described my invention, what I claim as new, and desire to secure by Letters Patent, is—

In an amalgamating-pan, the stationary hollow central pillar or pan-cone, J, the muller B, and yoke C, in combination with the vertical driving-shaft D, to which the yoke C is secured, and an adjustable and removable gib, H, let into the pan-cone at its point of greatest wear and forming a bearing-surface for the shaft D, substantially as herein described.

In witness whereof I hereunto set my hand.

CHARLES GRACEY.

Witnesses:
F. L. MOORE,
J. E. LAWRENCE.